United States Patent
Itskovich et al.

(10) Patent No.: US 9,709,692 B2
(45) Date of Patent: Jul. 18, 2017

(54) METHOD AND APPARATUS FOR BOREHOLE WALL RESISTIVITY IMAGING WITH FULL CIRCUMFERENTIAL COVERAGE

(75) Inventors: Gregory B. Itskovich, Houston, TX (US); Alexandre N. Bespalov, Spring, TX (US); Farhat A. Shaikh, Houston, TX (US); Peter John Nolan, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1506 days.

(21) Appl. No.: 12/288,171

(22) Filed: Oct. 17, 2008

(65) Prior Publication Data

US 2010/0097068 A1    Apr. 22, 2010

(51) Int. Cl.
  *G01V 3/20*    (2006.01)
(52) U.S. Cl.
  CPC ..................... *G01V 3/20* (2013.01)
(58) Field of Classification Search
  CPC ........................................... G01V 3/20
  USPC ......................................... 324/367
  See application file for complete search history.

(56) References Cited

U.S. PATENT DOCUMENTS

| | | | |
|---|---|---|---|
| 2,633,485 A * | 3/1953 | Patnode | 324/347 |
| 2,930,969 A | 3/1960 | Baker | |
| 3,365,658 A | 1/1968 | Birdwell | |
| 4,122,387 A | 10/1978 | Ajam et al. | |
| 4,278,942 A * | 7/1981 | Bonnet et al. | 324/347 |
| 4,468,623 A | 8/1984 | Gianzero et al. | |
| 4,511,843 A * | 4/1985 | Thoraval | 324/338 |
| 4,748,415 A | 5/1988 | Vail, III | |
| 4,794,322 A | 12/1988 | Davies | |
| 5,075,626 A | 12/1991 | Vail, III | |
| 5,502,686 A | 3/1996 | Dory et al. | |

(Continued)

FOREIGN PATENT DOCUMENTS

CA         685727 A      5/1964

OTHER PUBLICATIONS

S. Bonner et al.; "Resistivity While Drilling-Images From the String," Oilfield Review, Spring 1996, pp. 4-19.

(Continued)

*Primary Examiner* — Thomas Valone
(74) *Attorney, Agent, or Firm* — Mossman, Kumar & Tyler, PC

(57) ABSTRACT

A logging tool for performing resistivity measurements on the sidewall of a borehole in an earth formation is provided with a circumferential series of evenly-spaced measurement electrodes providing complete circumferential coverage of resistivity measurements. In one embodiment, the measurement electrodes are carried on a conductive pad circumferentially surrounding an elongate mandrel or tubular. The conductive pad is held at a voltage adapted to focus measurement current into the sidewall of the borehole. Preferably, the pad has dimensions relative to the measurement electrodes and a standoff distance between the measurement electrodes and said borehole wall to effectively focus the measurement current into the borehole wall. In accordance with one aspect of the invention, the measurement electrodes are spaced apart by a distance that is less than the width of each measurement electrode, thereby ensuring full circumferential resolution.

13 Claims, 5 Drawing Sheets

(56) References Cited

U.S. PATENT DOCUMENTS

| | | | |
|---|---|---|---|
| 6,348,796 B2* | 2/2002 | Evans et al. | 324/374 |
| 6,353,322 B1 | 3/2002 | Tabarovsky et al. | |
| 6,600,321 B2 | 7/2003 | Evans | |
| 6,714,014 B2 | 3/2004 | Evans et al. | |
| 7,298,147 B2 | 11/2007 | Benimeli et al. | |
| 7,385,401 B2* | 6/2008 | Itskovich et al. | 324/357 |
| 7,394,258 B2* | 7/2008 | Itskovich et al. | 324/357 |
| 7,397,250 B2* | 7/2008 | Bespalov et al. | 324/357 |
| 7,616,001 B2 | 11/2009 | Itskovich | |
| 7,696,757 B2* | 4/2010 | Itskovich et al. | 324/367 |
| 2005/0134279 A1 | 6/2005 | Hu et al. | |
| 2007/0046291 A1* | 3/2007 | Itskovich | 324/367 |
| 2007/0159351 A1 | 7/2007 | Madhavan et al. | |
| 2008/0068024 A1 | 3/2008 | Gold et al. | |
| 2008/0068025 A1* | 3/2008 | Gold et al. | 324/367 |
| 2008/0303526 A1* | 12/2008 | Itskovich et al. | 324/367 |
| 2011/0019500 A1* | 1/2011 | Plyushchenkov et al. | 367/31 |

OTHER PUBLICATIONS

P. D. Williams et al.; "Analysis of a Fractured Carbonate Reservoir (Thamama Group) Using Borehole Images From an Horizontal Well, Offshore UAE," SPE 87303, 9th Abu Dhabi International Petroleum Exhibition and Conference, Abu Dhai, UAE, Oct. 15-18, 2000, pp. 1-9.

* cited by examiner

METHOD AND APPARATUS FOR BOREHOLE WALL RESISTIVITY IMAGING WITH FULL CIRCUMFERENTIAL COVERAGE

FIELD OF THE INVENTION

The present invention relates generally to wireline measurement tools used in hydrocarbon exploration and production, and more particularly to a wireline measurement tool for borehole wall resistivity measurements.

BACKGROUND OF THE INVENTION

Electrical earth borehole logging is well known and various devices and various techniques have been described for such purposes. Broadly speaking, there are two categories of devices used in electrical logging devices. In the first category, measure electrodes (current sources or sinks) are in employed conjunction with a diffuse return electrode (such as the tool body or an extension thereof). A measured current flows in a circuit that connects a current source to the measure electrodes, through the earth formation to the return electrode and back to the current source in the tool. In the second category, that of inductive measuring tools, on the other hand, an antenna within the measuring instrument induces a current flow within the earth formation. The magnitude of the induced current is detected using either the same antenna or a separate receiver antenna. The present invention belongs to the former category.

There are several potential modes of operation of a borehole resistivity measurement device. In one, the current at the measuring electrode is maintained constant and a voltage is measured, while in a second mode, the voltage of the electrode is fixed and the current flowing from the electrode is measured. Ideally, it is desirable that if the current is varied to maintain constant voltage at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Numerous examples of the use of focused electrodes for resistivity measurements have been shown in the prior art. One such example is proposed in U.S. Pat. No. 6,348,796 to Evans et al., entitled "Image Focusing Method and Apparatus for Wellbore Resistivity Imaging." The Evans '796 patent is commonly assigned to the assignee of the present invention and is hereby incorporated by reference herein in its entirety.

In the '796 patent, there is disclosed an apparatus that includes an array of measure electrodes separated from a pad or the body of the instrument by focus electrodes, the pad or body acting as the guard electrode. The focus electrode is maintained at a slightly lower potential than the pad, and the measure electrode is at an intermediate potential thereto. With this arrangement, the current from the measure electrode initially diverges as it enters the formation, then converges (focuses) and then final diverges again to define a depth of investigation. This arrangement tends to reduce the instruments sensitivity to borehole rugosity.

The use of focusing electrodes is also discussed in U.S. Pat. No. 6,600,321 to Evans, entitled "Apparatus and Method for Wellbore Resistivity Determination and Imaging Using Capacitive Coupling." The Evans '321 patent is commonly assigned to the assignee of the present invention and is hereby incorporated by reference herein in its entirety.

In typical borehole resisitivity measuring instruments, such as disclosed in the aforementioned Evans '321 patent, there are a plurality of resistivity arrays, evenly spaced around the circumference of the tool body (mandrel). Each array comprises a pad surrounding plurality of measurement electrodes and one or more focusing electrodes. There may be, for example, four or six separate resistivity arrays disposed around the circumference of the instrument. The more arrays to be provided, the smaller each array must be in order for all to physically fit around the circumference of the array.

Accordingly, one perceived drawback of such prior art arrangements is that they tend to provide an incomplete image of the borehole, as a result of the gaps that necessarily exist between adjacent resistivity arrays on the instrument. The present invention is intended to address this disadvantage of the prior art.

SUMMARY OF THE INVENTION

In particular, one embodiment of the present invention is an apparatus for evaluating an earth formation, and in particular, the resistivity properties of a borehole wall. The apparatus includes a downhole assembly conveyed in a borehole in the earth formation. The downhole assembly may include a member, such as a mandrel, having a finite, non-zero conductivity. A plurality of closely-spaced measurement electrodes are carried on a circumferential pad, with the length of the pad being substantially longer the length of the measurement electrodes. This arrangement achieves "ultra focusing" of the measurement currents, enabling the tool to accurately operate with a standoff from the borehole wall of up to one inch.

BRIEF DESCRIPTION OF THE DRAWINGS

The present invention is best understood with reference to the attached drawings in which like numerals refer to like elements, and in which.

DETAILED DESCRIPTION OF A PREFERRED EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts might be complex and time-consuming, outside the knowledge base of typical laymen, but would nevertheless be a routine undertaking for those of ordinary skill in the relevant fields.

Figure 1:
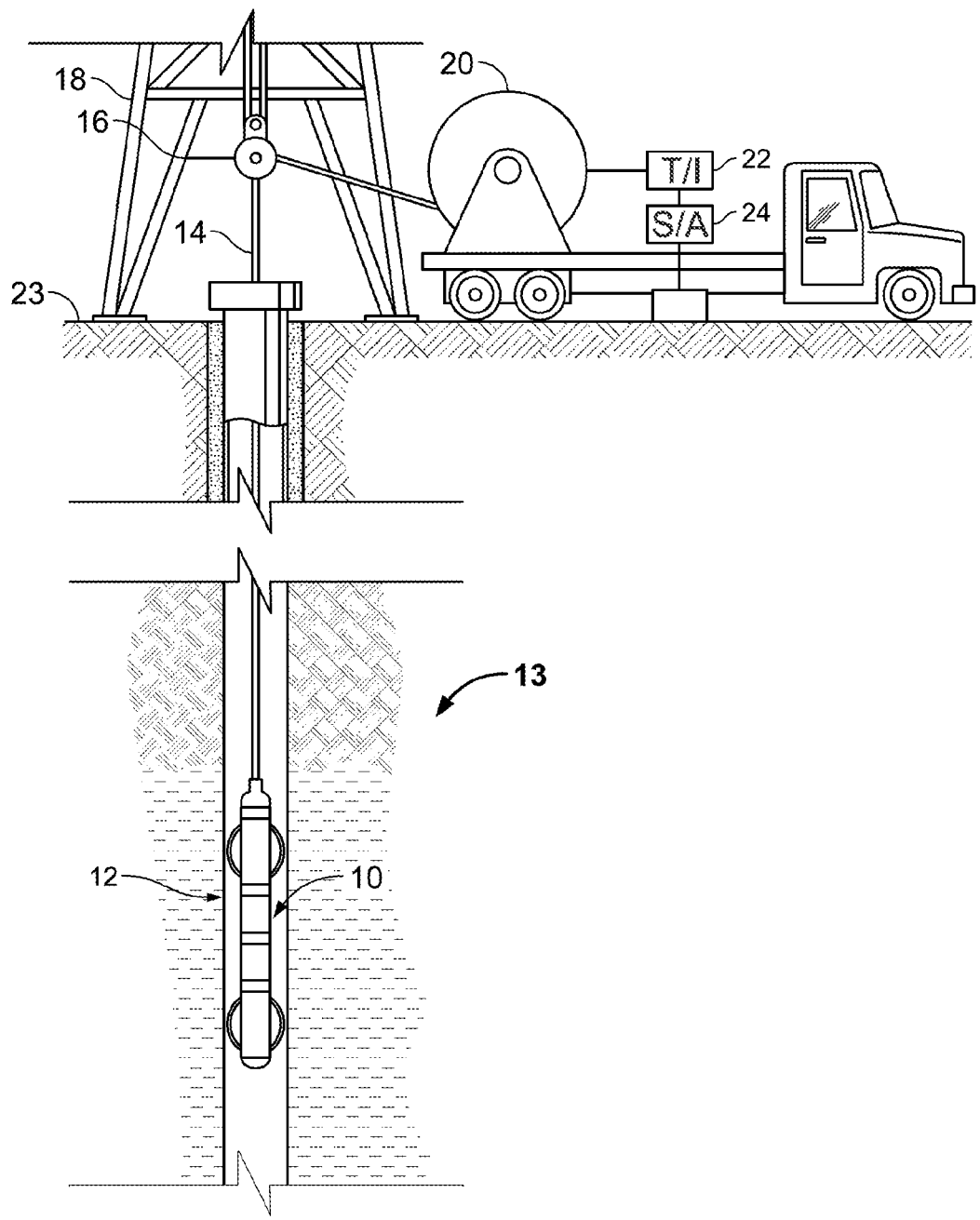
FIG. 1 is a functional diagram of a wireline measurement operation in accordance with conventional practices.

FIG. 1 shows a borehole imaging tool 10 suspended in a borehole 12 that penetrates the earth formation such as 13. The tool 10 is suspended by a suitable cable 14 that passes over a sheave 16 mounted on a drilling platform 18. By industry standard, the cable 14 includes a stress member and seven conductors for transmitting commands to the tool and for receiving data back from the tool, as well as power for the tool. The tool 10 is raised and lowered by draw works 20. An electronics module 22, on the surface 23, transmits the required operating commands downhole and in turn receives data back from the tool which may be recorded on an archival storage medium of any desired type for concurrent or later processing. The data may be transmitted in analog or digital form. Data processors such as a suitable computer 24 may be provided for performing data analysis in the field in real time or on the recorded data, after it is sent to a processing center for post-processing of the data.

Figure 2:
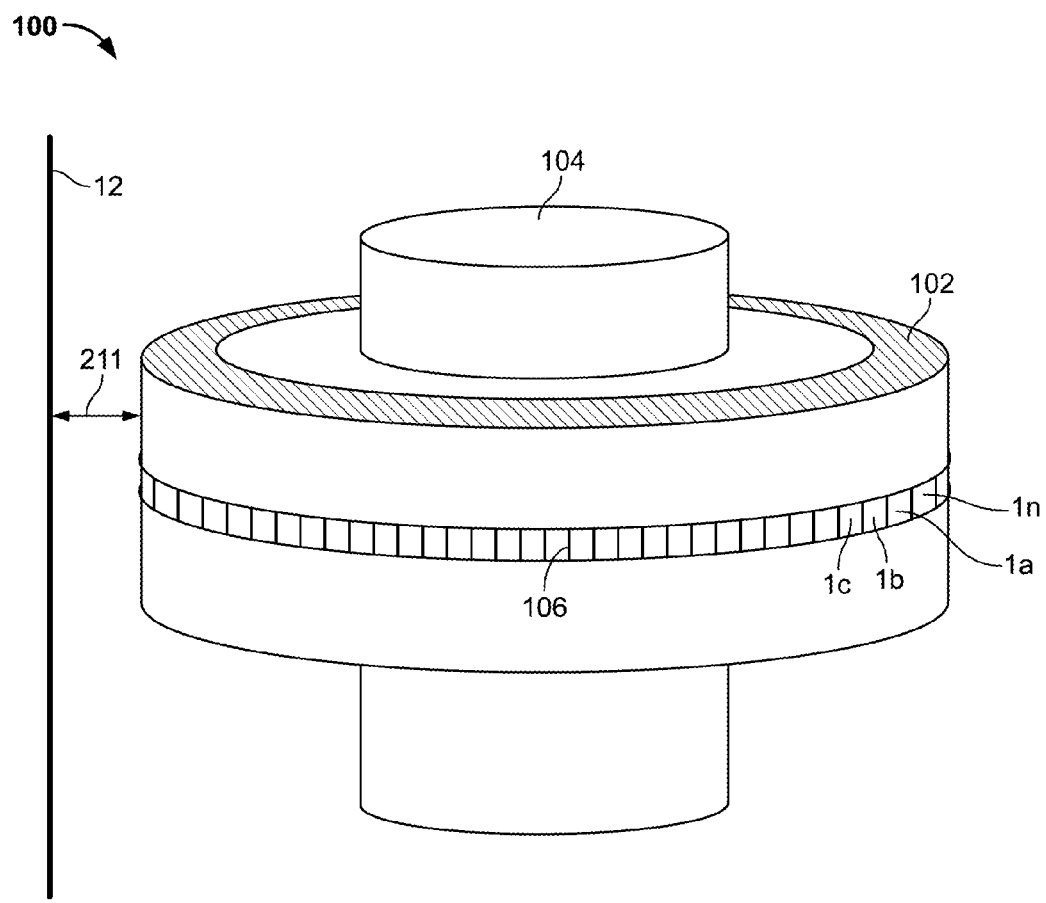
FIG. 2 is a perspective diagram of a portion of a downhole measurement tool configured in accordance with one embodiment of the invention.

Referring to FIG. 2, there is shown a perspective view of a borehole resistivity measurement instrument 100 in accordance with one embodiment of the invention. As shown in FIG. 2, instrument 100 comprises an elongate, preferably cylindrical mandrel or tubular 101 carring a unitary, circumferential pad 102. Circumferential pad, in turn, carries thereon a continuous, circumferential series of measurement buttons (electrodes) 1a, 1b, . . . 1n. The buttons are placed on one unitary circumferential pad 102 extending around tubular or mandrel 104, which in the presently disclosed embodiment is also electrically conductive, and insulated by insulator layer 107 from a return electrode 108. Buttons (electrodes) 1a, 1b, . . . 1n. are separated from one another by thin isolative gaps 106. In a preferred embodiment of the invention, the distance between any two electrodes is less than the width of the individual electrodes. In one embodiment, buttons (electrodes) 1a, 1b, . . . 1n are 4 mm×4 mm in size.

In accordance with an important aspect of the invention, full circumferential measurement is achieved, rather than the segmented coverage of prior art resistivity measurement tools. Preferably, pad 102 is conductive, and in operation of tool 100 pad 102 is kept under some fixed potential defined by the applied voltage. In one embodiment, all of the buttons are also maintained under the same potential with the surface of the pad.

As would be appreciated by those of ordinary skill in the art, one challenge for achieving full circumferential coverage of the borehole is providing immunity of the system to the inevitable parasitic effects from the standoff 211 between the pad 102 and a borehole wall 12. Since water-based drilling fluid (mud) is usually more conductive than the formation, the path of least resistance extends from the button to the return, through the mud, and only an insignificant portion of the current leaks into the formation. The amount of this leakage increases with conductivity of the formation and it goes down as the formation becomes more resistive.

Figure 3:
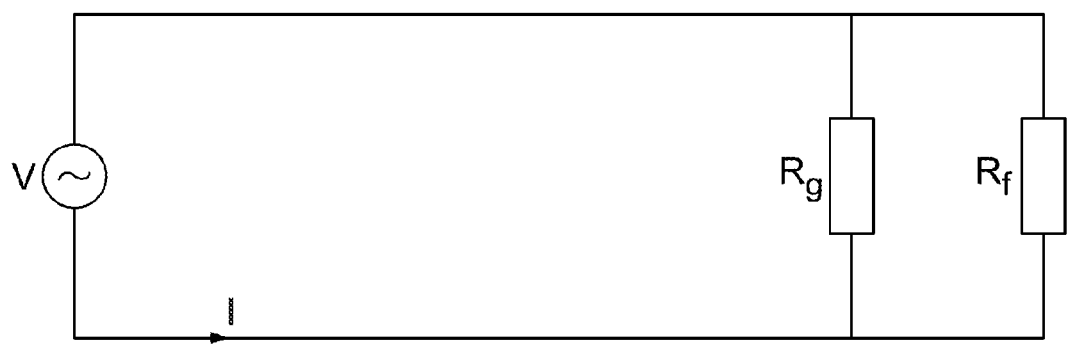
FIG. 3 is an electrical schematic representing the measurement tool from FIG. 2.

FIG. 3 is a simplified schematic diagram for a single button electrode 1. As shown, the current I in the circuit depends on the gap resistance $R_g$ and the resistivity of the formation $R_f$. In turn, the gap resistance $R_g$ is a function of the mud resistivity, the standoff between the button and the borehole wall, the length of the mandrel (return electrode), and the length of the pad 102.

Being equipotential, the conductive mandrel 104 is focusing the current in the radial direction (perpendicular to the borehole axis). The same focusing effect may be achieved by increasing the length of the metal pad 102. That is, by performing focusing, the current is forced into the formation. The better the focusing is, the narrower the current tubes representing vertical current going from the button to the return through the mud. As would be appreciated by those of ordinary skill, any means of increasing the gap resistance $R_g$ relative to the formation resistance $R_f$, such as by increased focusing conditions or reduction of standoff, tends to increase the sensitivity of the instrument 100 of measured current to formation resistivity, reducing the parasitic effects arising out of the presence of the gap.

If V is the applied voltage and $R_e = R_g R_f/(R_g + R_f)$ is the effective impedance, then the current I in the circuit is given by $$I = \frac{V}{R_e} = \frac{V(R_g + R_f)}{R_g R_f}$$

If the condition $R_g \gg R_f$ holds, the measured current follows the conductivity (or inversely, the resistivity) of the formation. That is $$I = \frac{V}{R_e} \approx \frac{V}{R_f}$$

In one embodiment of the invention, the size of the pads is chosen to provide sufficient focusing conditions even for standoff values on the order of one inch.

Figure 4:
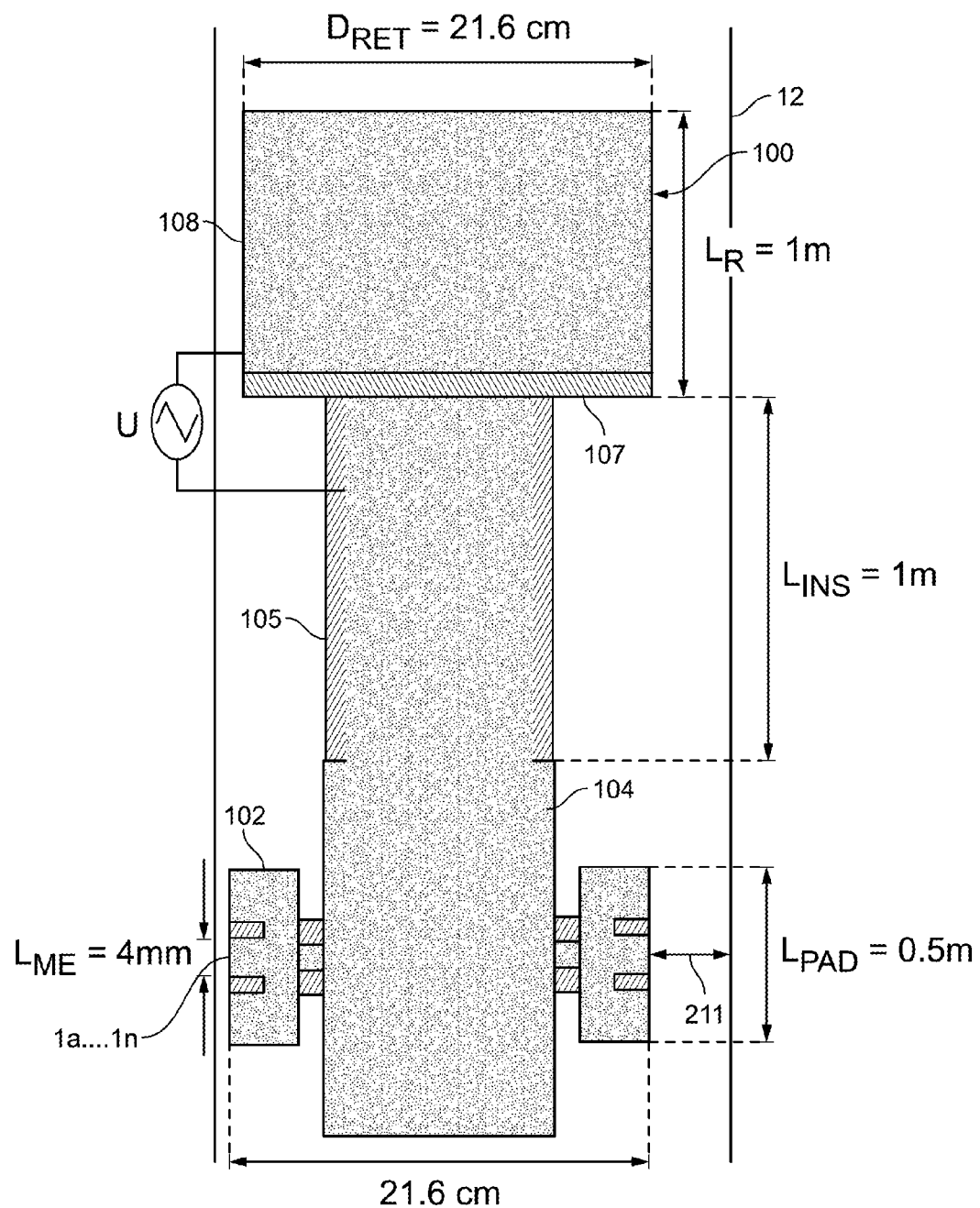
FIG. 4 is a side, cross-sectional view, two-dimensional model of a measurement tool in accordance with one embodiment of the invention.
Figure 5:
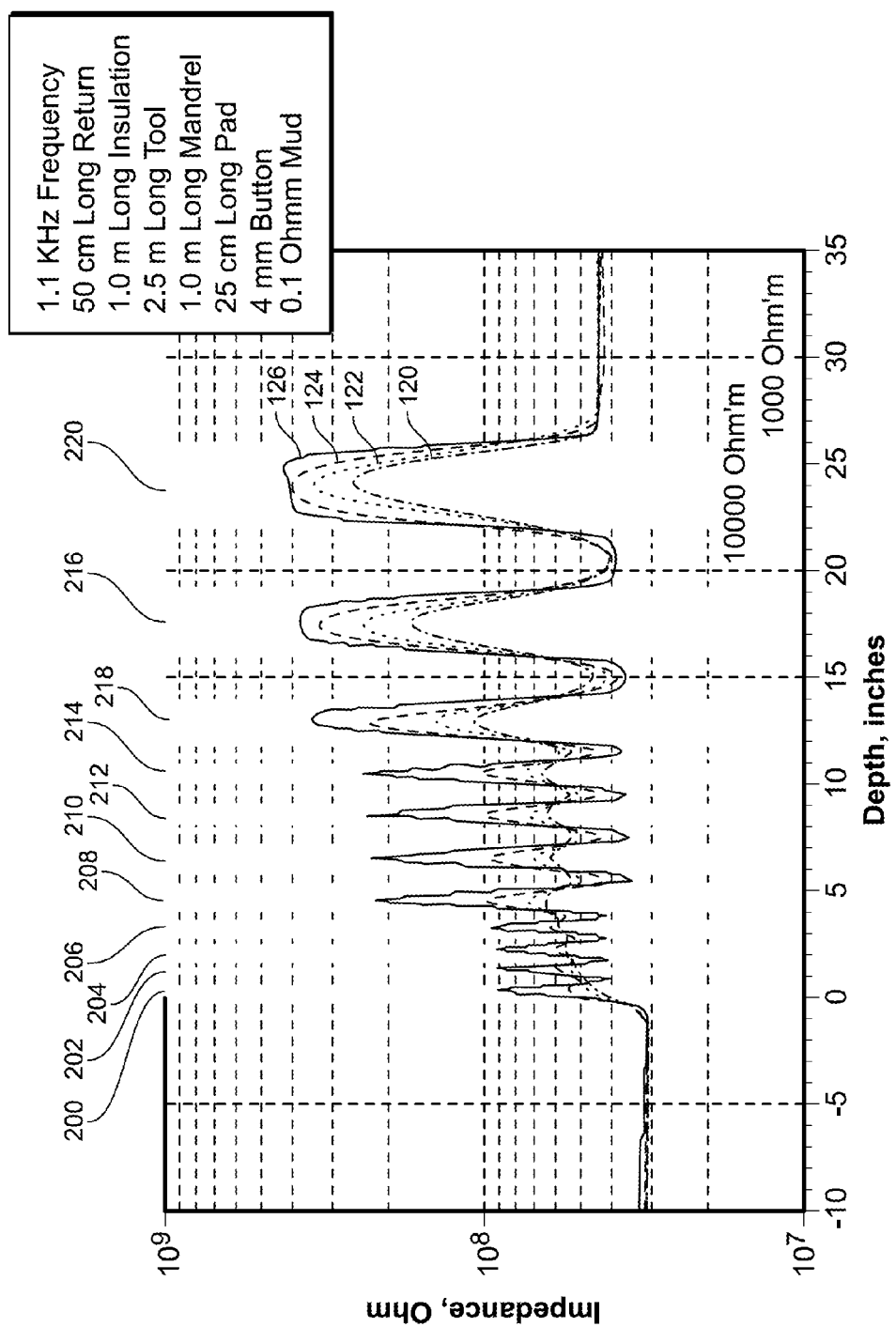
FIG. 5 is a plot of logging depth versus impedance from data obtained in accordance with one embodiment of the invention.

The validity of the approach of the present invention can be illustrated by means of 2D mathematical modeling. Referring to FIG. 5, there is shown a side schematic 2D representation of resisitivity instrument 100 in accordance with one embodiment of the invention. FIG. 4 shows instrument 100 having a pad 102, a return electrode 108, insulation 105, 107, mandrel 104, and measurement electrodes 1a, 1b, 1c, . . . 1n. The pad 102, return electrode 108, and measurement electrodes 1a, 1b, 1c, . . . 1n are modeled as a conductive ring carried by pad 102, which in turn is mounted on the mandrel 104. For the purposes of modeling, the operating frequency is specified to be 1.1 KHz. The return electrode 108 has a length $L_R$ of 1 m, the length of the insulation $L_{INS}$ is 1 m, and the length of the conductive ring representing the individual measurement electrodes 1a, 1b, 1c, . . . 1n ($L_{ME}$) is 4 mm. The pad 102, on the other hand, has a length $L_P$ of 0.25 m, which is more than 50 times greater than the length $L_{ME}$ of the measurement electrodes 1a . . . 1n.

In accordance with one aspect of the invention, the tool is adapted to provide accurate measurements despite some amount of standoff between the measurement electrodes and the sidewall of the borehole. In particular, in the presently preferred embodiment, the ratio of the pad length to the maximum standoff (referred to herein as the pad-standoff ratio) is considered, along with the ratio of the pad length to the measuring electrode length, in order to achieve the "ultra focusing" of the measurement current, i.e., directing the maximum amount of measurement current into the formation and less in the drilling fluid.

For example, in the disclosed embodiment, with a pad length of 0.25 m (25 cm), if it is desired to achieve accurate measurements with a maximum standoff of one-half inch, or 1.25 cm, the pad-standoff ratio would be 25/1.25=20:1. If a greater maximum standoff value is preferred, the tool can be designed to have pad length $L_P$ that is increased accordingly. In order to provide accurate measurements at a standoff of up to one inch, with a 25 cm pad, the pad-standoff ratio would be approximately 10:1.

Referring to FIG. 5, the benchmark model is comprised of series of 10,000 ohmm layers 200, 202, 204, 206, 208, 210, 212, 214, 216, 218 and 220; these high-resistivity layers represent layers of hydrocarbons. Between the hydrocarbon layers are layers of 1,000 ohmm resistivity, representing non-hydrocarbon formations. The region is modeled such that it is crossed by an 8.5 inch borehole filled with 0.1 ohmm mud. The thickness of the first 4 layers 200, 204, 206, and 208 is 0.5 inch, the next four layers are 1 inch thick (210), then two 2 inch layers 212 and 214, two 3 inch layers 216 and 218, and one 4 inch layer 220.

The modeling results are presented in FIG. 5, where x-axis is a logging depth, while the y-axis is the simulated impedance. The various curves 120, 122, 124, and 126 correspond to standoff distances of 1 inch, 0.75 inch, 0.50 inch and 0.25 inch, respectively. From FIG. 5, it is apparent that with the arrangement schematically depicted in FIG. 4, and in particular, with a pad length-to-measurement electrode length greater than 50×, pronounced features of the curves 120, 122, 124, and 126 accurately identify the layers of alternating resistivity for a standoff of up to one inch.

In particular, from the presented results of the mathematical modeling it can be observed that that in case of 0.25 inch standoff all the layers are well resolved and resolution deteriorates with increasing standoff. But, even for the 0.75 inch standoff the system is capable to detect all the 1-inch layers and thicker.

From the foregoing disclosure, it should be apparent that a tool for resistivity measurements of a borehole wall with full circumferential resolution has been disclosed. Tools in accordance with the invention have been shown to be achieve accurate results even in cases of standoff gaps between the tool and the sidewall of up to one inch or so.

Those of ordinary skill in the art will recognize that the present invention may be advantageously practiced in conjunction with anyone of a multitude of known wire logging devices. Although a specific embodiment of the invention as well as possible variants and alternatives thereof have been described and/or suggested herein, it is to be understood that the present disclosure is intended to teach, suggest, and illustrate various features and aspects of the invention, but is not intended to be limiting with respect to the scope of the invention, as defined exclusively in and by the claims, which follow.

Indeed, it is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiment of the invention without necessarily departing from the technical and legal scope of the invention as defined in the following claims.

What is claimed is:

1. An apparatus for performing electrical logging in a borehole through an earth formation, comprising:
    a mandrel; and
    a circumferential pad disposed upon said mandrel and carrying a plurality of individual measurement electrodes evenly spaced around the entire circumference of said pad and configured to supply measurement current to the formation, the circumferential pad extending continuously around the mandrel;
    at least one focusing electrode held at a potential sufficient to focus said measurement current into said borehole wall, thereby reducing the flow of current through fluid surrounding said tool;
    wherein said focusing electrode has dimensions sufficient to focus said measurement current into said borehole wall when said measurement electrodes are spaced apart from said borehole wall by a standoff of at least one-half inch.

2. The apparatus in accordance with claim 1, wherein the distance between each pair of said plurality of measurement electrodes is less than the width of each electrode.

3. The apparatus in accordance with claim 2, wherein the ratio of the length of said circumferential pad and a standoff between said electrodes and the sidewall of said borehole is at least 10:1.

4. The apparatus in accordance with claim 2, wherein the ratio of the length of said pad to the length of each of said plurality of electrodes is at least 50:1.

5. The apparatus in accordance with claim 1, wherein the pad is one unitary pad that extends around the mandrel.

6. The apparatus in accordance with claim 1, wherein the mandrel is configured to be conveyed by a cable.

7. The apparatus in accordance with claim 1, comprising at least one processor configured to model the measurement electrodes as a conductive ring carried by the pad.

8. The apparatus in accordance with claim 1, comprising an insulation layer disposed upon and circumferentially surrounding said mandrel and axially separating the pad from a return electrode.

9. A method for performing resistivity measurements in a borehole through an earth formation, comprising:
    (a) using a measurement tool to inject a measurement current into said borehole wall;
    (b) providing at least one focusing electrode held at a potential sufficient to focus said measurement current into said borehole wall, thereby reducing the flow of current through fluid surrounding said tool;
    (c) taking resistivity measurements at a plurality of measurement electrodes arranged circumferentially around said measurement tool, said measurement electrodes being carried on a circumferential pad that extends continuously around said tool and being evenly spaced apart by a distance that is less than the width of each of said measurement electrodes, such that the tool has full circumferential resolution;
    (d) using the resistivity measurements to generate a resistivity image of the borehole; and
    (e) using the resistivity image to conduct at least one of:
        i) hydrocarbon exploration, and
        ii) hydrocarbon production;
    wherein said focusing electrode has dimensions sufficient to focus said measurement current into said borehole wall when said measurement electrodes are spaced apart from said borehole wall by a standoff of at least one-half inch.

10. The method in accordance with claim 9, wherein the pad is one unitary pad that extends around the tool.

11. The method in accordance with claim 9, further comprising conveying the tool through the borehole using a cable.

12. The method in accordance with claim 9, comprising modeling the measurement electrodes as a conductive ring carried by the pad.

13. The method in accordance with claim 9, comprising using an insulation layer to circumferentially surround said mandrel and axially separate the pad from a return electrode.

* * * * *